(12) United States Patent
Wei

(10) Patent No.: US 11,888,904 B2
(45) Date of Patent: Jan. 30, 2024

(54) PACKET SENDING METHOD, PACKET RECEIVING METHOD, AND NETWORK DEVICE

(71) Applicant: Huawei Technologies Co., Ltd., Shenzhen (CN)

(72) Inventor: Jianxiong Wei, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 223 days.

(21) Appl. No.: 17/087,138

(22) Filed: Nov. 2, 2020

(65) Prior Publication Data

US 2021/0075829 A1    Mar. 11, 2021

Related U.S. Application Data

(63) Continuation of application No. PCT/CN2019/105673, filed on Sep. 12, 2019.

(30) Foreign Application Priority Data

Sep. 17, 2018    (CN) .......................... 201811083093.3

(51) Int. Cl.
*H04L 9/40* (2022.01)
*H04L 69/22* (2022.01)
*H04L 45/50* (2022.01)

(52) U.S. Cl.
CPC ........ *H04L 63/205* (2013.01); *H04L 63/0428* (2013.01); *H04L 69/22* (2013.01); *H04L 45/50* (2013.01)

(58) Field of Classification Search
CPC .......................... H04L 69/22; H04L 63/0428
See application file for complete search history.

(56) References Cited

U.S. PATENT DOCUMENTS

| 7,117,365 | B1 | 10/2006 | Rump et al. |
| 7,254,835 | B2 | 8/2007 | St. Pierre et al. |
| 8,266,267 | B1 | 9/2012 | Guruswamy et al. |
| 9,185,130 | B2 | 11/2015 | Sato |
| 9,294,378 | B2 | 3/2016 | Jackowski et al. |

(Continued)

FOREIGN PATENT DOCUMENTS

| CN | 102271086 A | 12/2011 |
| CN | 102870490 A | 1/2013 |

(Continued)

OTHER PUBLICATIONS

IEEE Std 802.1AE, "Media Access Control (MAC) Security," IEEE, 3 Park Avenue, New York, NY 10016-5997, USA, 2018, 239 pages.

(Continued)

*Primary Examiner* — Esther B. Henderson
(74) *Attorney, Agent, or Firm* — Conley Rose, P.C.

(57) ABSTRACT

A packet sending method includes generating, by a network device, a first packet, and sending the first packet. The first packet includes a first packet header, a second packet header, and protected data. The first packet header includes an indication field. The indication field indicates that the first packet includes the second packet header. The second packet header includes a type field. The type field indicates a first protection protocol. The protected data is protected by using the first protection protocol.

20 Claims, 9 Drawing Sheets

| IP header | Extension packet header | ESP header | TCP header | Data | ESP trailer | ESP ICV |

◄— — — — Encrypted data — — — —►

(56) References Cited

U.S. PATENT DOCUMENTS

| | | |
|---|---|---|
| 2003/0156582 A1 | 8/2003 | Belgaied et al. |
| 2005/0216731 A1 | 9/2005 | Saito et al. |
| 2008/0126559 A1 | 5/2008 | Elzur et al. |
| 2014/0133309 A1 | 5/2014 | Zhang et al. |
| 2014/0281530 A1* | 9/2014 | Song ............... H04L 63/123 713/168 |
| 2015/0110113 A1* | 4/2015 | Levy ................ H04L 45/745 370/392 |
| 2015/0110133 A1 | 4/2015 | Zhou |
| 2015/0256456 A1* | 9/2015 | Previdi ............ H04L 45/745 370/392 |
| 2016/0088601 A1 | 3/2016 | Liu et al. |
| 2016/0182303 A1 | 6/2016 | Baba et al. |
| 2019/0068762 A1 | 2/2019 | Liu |

FOREIGN PATENT DOCUMENTS

| | | |
|---|---|---|
| CN | 103873464 A | 6/2014 |
| CN | 104184645 A | 12/2014 |
| CN | 105592030 A | 5/2016 |
| CN | 105721359 A | 6/2016 |
| CN | 107306198 A | 10/2017 |
| CN | 107342964 A | 11/2017 |
| CN | 107547508 A | 1/2018 |
| EP | 1764980 A1 | 3/2007 |
| JP | H10126406 A | 5/1998 |
| JP | 2000287192 A | 10/2000 |
| JP | 4248152 B2 | 4/2009 |
| JP | 2016140058 A | 8/2016 |
| WO | 2014170715 A1 | 10/2014 |
| WO | 2016150205 A1 | 9/2016 |

OTHER PUBLICATIONS

IEEE Std 802.1XT, "Port-Based Network Access Control," IEEE, 3 Park Avenue, New York, NY10016-5997, USA, Feb. 5, 2010, 222 pages.

Rosen, E., et al., "Multiprotocol Label Switching Architecture," RFC 3031, Jan. 2001, 61 pages.

Rosen, E., et al., "MPLS Label Stack Encoding," RFC 3032, Jan. 2001, 23 pages.

Bryant, S., et al., "Pseudowire Emulation Edge-to-Edge (PWE3), Control Word for Use over an MPLS PSN," RFC 4385, Feb. 2006, 12 pages.

Kompella, K., et al., "Allocating and Retiring Special-Purpose MPLS Labels," RFC 7274, Jun. 2014, 11 pages.

\* cited by examiner

| MPLS header | Label | Exp | S | TTL |
|---|---|---|---|---|

FIG. 8

| VXLAN GPE | Flag | Reserved 1 | Next protocol | VNI | Reserved 2 |
FIG. 11
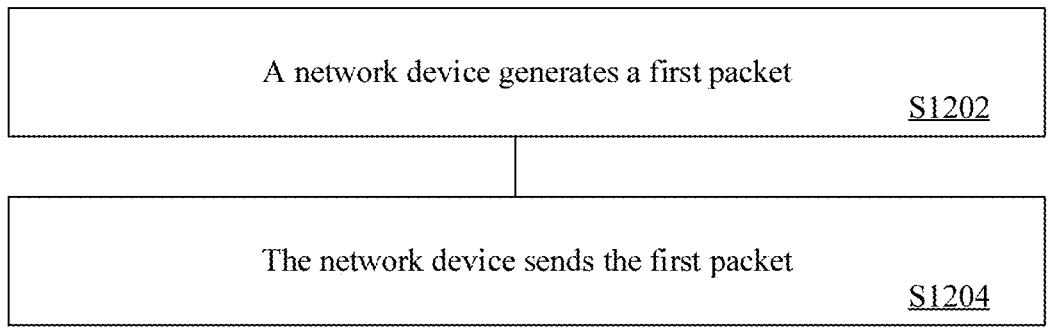
FIG. 12
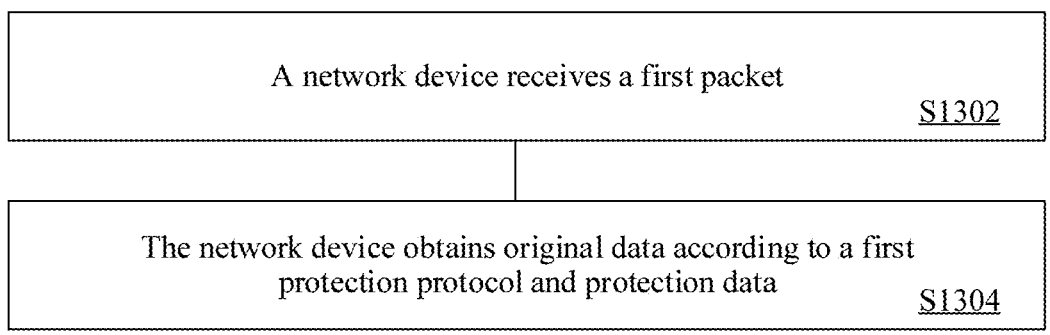
FIG. 13

PACKET SENDING METHOD, PACKET RECEIVING METHOD, AND NETWORK DEVICE

CROSS-REFERENCE TO RELATED APPLICATIONS

This application is a continuation of International Patent Application No. PCT/CN2019/105673 filed on Sep. 12, 2019, which claims priority to Chinese Patent Application No. 201811083093.3 filed on Sep. 17, 2018. The disclosures of the aforementioned applications are hereby incorporated by reference in their entireties.

TECHNICAL FIELD

Embodiments of this application relate to the field of communications technologies, and especially, to a packet sending method, a packet receiving method, and a network device.

BACKGROUND

To enhance data security, data to be transmitted in an existing network may be protected by using a specific protocol. Data protected by using a specific protocol is referred to as protected data, and a protocol used to protect data is referred to as a protection protocol below.

Protected data transmitted in a network may be carried in a packet. Further, a packet header may include a field used to indicate a protection protocol corresponding to the protected data. For example, a packet header of an Ethernet frame (an Ethernet frame header) includes an Ethernet type field. When a value of the Ethernet type field is 0x88E5, the Ethernet type field indicates that the protection protocol corresponding to the protected data is a Media Access Control Security (MACsec) protocol.

The foregoing solution can support a relatively small quantity of protection protocols and has relatively poor scalability.

SUMMARY

This application provides a packet sending method, a packet receiving method, and a network device. The foregoing technical solutions have better scalability and can support more protection protocols.

According to a first aspect, a packet sending method is provided. The method includes that a network device generates a first packet, and sends the first packet. The first packet includes a first packet header, a second packet header, and protected data. The first packet header includes an indication field. The indication field is used to indicate that the first packet includes the second packet header. The second packet header includes a type field. The type field is used to indicate a first protection protocol. The protected data is data protected by using the first protection protocol.

In a solution in other approaches, one field in a packet header is used to indicate a protection protocol. A field used to indicate a protection protocol in a packet header in the other approaches is referred to as a special field below. Some values of the special field may have been defined in a specific protocol. Therefore, an available value range of the special field may be limited. For example, an Ethernet frame includes an Ethernet frame header and a payload. The Ethernet frame header includes an Ethernet type, and the Ethernet type is used to indicate a protocol of a packet in the payload. For example, when a value of the Ethernet type in the Ethernet frame header is 0x0800, the payload includes an Internet Protocol (IP) version 4 (IPv4) packet, or when a value of the Ethernet type in the Ethernet frame header is 0x0806, the payload includes an Address Resolution Protocol (ARP) packet. Therefore, the Ethernet type may theoretically indicate $2^{16}$ protocols. Because some values of the Ethernet type have been defined, an available value of the Ethernet type is less than $2^{16}$ during product implementation.

In the solution of this application, the first packet header of the first packet includes the indication field, the indication field indicates that the first packet includes the second packet header, the second packet header includes the type field, and the type field indicates the first protection protocol. The foregoing means that, in the solution of this application, only one available value of the indication field needs to be used to indicate that the first packet includes the second packet header. The second packet header is a packet header defined in this application, and an available value range of the type field in the second packet header is not limited. For example, when the type field in the second packet header has 16 bits, the type field in the second packet header may theoretically indicate $2^{16}$ protection protocols.

In this case, a field in a packet may indicate more protection protocols in the solution of this application. Therefore, the solution of this application has better scalability and can support more protection protocols.

In a possible design, the second packet header further includes an offset field, and the offset field is used to indicate a location of the protected data.

A receiving device that receives the first packet may determine the location of the protected data based on the offset field. Further, the receiving device may de-protect the protected data to obtain original data. The original data is data that is not protected by using the first protection protocol.

The receiving device may determine the location of the protected data in the first packet according to the first protection protocol indicated by the type field. For example, when the first protection protocol is an Encapsulating Security Payload (ESP) protocol, the receiving device may determine that the protected data follows an ESP header of the first packet. However, when the receiving device determines the location of the protected data in the first packet according to the first protection protocol, the receiving device needs to perform relatively complex processing, and needs to spend a lot of time in determining the location of the protected data in the first packet. It is relatively easy to determine the location of the protected data based on the offset field, which consumes less time.

In a possible design, the second packet header further includes a length field, and the length field indicates a length of the second packet header.

The receiving device that receives the first packet may determine a location of a protection protocol header based on the length field. For example, when the first protection protocol is the ESP protocol, the receiving device may determine a location of the ESP header in the first packet based on the length field, and the receiving device may further parse the ESP header according to stipulations of the ESP protocol.

In a possible design, the second packet header further includes a flag field, and the flag field indicates that the second packet header includes the offset field.

The receiving device that receives the first packet may determine, based on the flag field, that the first packet includes the offset field. Further, the receiving device may obtain the offset field, and determine the location of the protected data based on the offset field.

According to a second aspect, a packet receiving method is provided. The method includes that a network device receives a first packet. The first packet includes a first packet header, a second packet header, and protected data. The first packet header includes an indication field. The indication field is used to indicate that the first packet includes the second packet header. The second packet header includes a type field. The type field is used to indicate a first protection protocol. The protected data is data protected by using the first protection protocol.

The method further includes that the network device obtains original data according to the first protection protocol and the protected data. The original data is not protected by using the first protection protocol.

In the foregoing technical solution, the first packet may be the first packet sent by the network device in the first aspect.

In a possible design, the second packet header further includes an offset field, and the offset field is used to indicate a location of the protected data.

In a possible design, the second packet header further includes a length field, and the length field indicates a length of the second packet header.

In a possible design, the second packet header further includes a flag field, and the flag field indicates that the second packet header includes the offset field.

According to a third aspect, a network device is provided. The network device includes a processor and a memory coupled to the processor. The memory stores a computer program, and when the computer program is executed by the processor, the network device is enabled to perform the method provided in the first aspect or the possible designs of the first aspect.

According to a fourth aspect, a network device is provided. The network device includes a processor and a memory coupled to the processor. The memory stores a computer program, and when the computer program is executed by the processor, the network device is enabled to perform the method provided in the second aspect or the possible designs of the second aspect.

According to a fifth aspect, a communications system is provided, and includes the network device provided in the third aspect and the network device provided in the fourth aspect. The network device provided in the third aspect is configured to perform the method provided in the first aspect or the possible designs of the first aspect. The network device provided in the fourth aspect is configured to perform the method provided in the second aspect or the possible designs of the second aspect.

According to a sixth aspect, this application provides a computer-readable storage medium. The computer-readable storage medium stores an instruction, and when the instruction is run on a computer, the computer is enabled to perform the method provided in the first aspect or the possible designs of the first aspect.

According to a seventh aspect, this application provides a computer-readable storage medium. The computer-readable storage medium stores an instruction, and when the instruction is run on a computer, the computer is enabled to perform the method provided in the second aspect or the possible designs of the second aspect.

In a possible design, the computer-readable storage medium is a non-transitory computer-readable storage medium.

According to an eighth aspect, this application provides a computer program product. The computer program product includes an instruction, and when the instruction is run on a computer, the computer is enabled to perform the method provided in the first aspect or the possible designs of the first aspect, or the computer is enabled to perform the method provided in the second aspect or the possible designs of the second aspect.

According to the technical solutions provided in the first aspect to the eighth aspect, in a possible design, the first protection protocol is an encryption protocol or an integrity protection protocol.

According to the technical solutions provided in the first aspect to the eighth aspect, in a possible design, the first protection protocol is an Authentication Header (AH) protocol, the ESP protocol, a MACsec protocol, a Transport Layer Security (TLS) protocol, or a Secure Sockets Layer (SSL) protocol.

According to the technical solutions provided in the first aspect to the eighth aspect, in a possible design, the first packet header is a multiprotocol label switching (MPLS) header, and the indication field is an MPLS label field in the first packet header.

According to the technical solutions provided in the first aspect to the eighth aspect, in a possible design, the first packet header is an Ethernet header, and the indication field is an Ethernet type field in the first packet header.

According to the technical solutions provided in the first aspect to the eighth aspect, in a possible design, the first packet header is an IP header, and the indication field is a protocol field in the first packet header.

According to the technical solutions provided in the first aspect to the eighth aspect, in a possible design, the first packet header is a Transmission Control Protocol (TCP) header, and the indication field is a reserved field or an option field.

According to the technical solutions provided in the first aspect to the eighth aspect, in a possible design, the first packet header is a Hypertext Transfer Protocol (HTTP) header, and the type field is an extension field.

BRIEF DESCRIPTION OF DRAWINGS

To describe the technical solutions in some of the embodiments of this application more clearly, the following briefly describes the accompanying drawings for describing the embodiments. The accompanying drawings in the following descriptions are merely some embodiments of this application.

FIG. 8 is a schematic structural diagram of an MPLS header according to this application;

FIG. 11 is a schematic structural diagram of VXLAN Generic Protocol Extension (GPE) according to this application;

FIG. 12 is a schematic flowchart of a method according to this application;

FIG. 13 is a schematic flowchart of a method according to this application;

DESCRIPTION OF EMBODIMENTS

Figure 1:
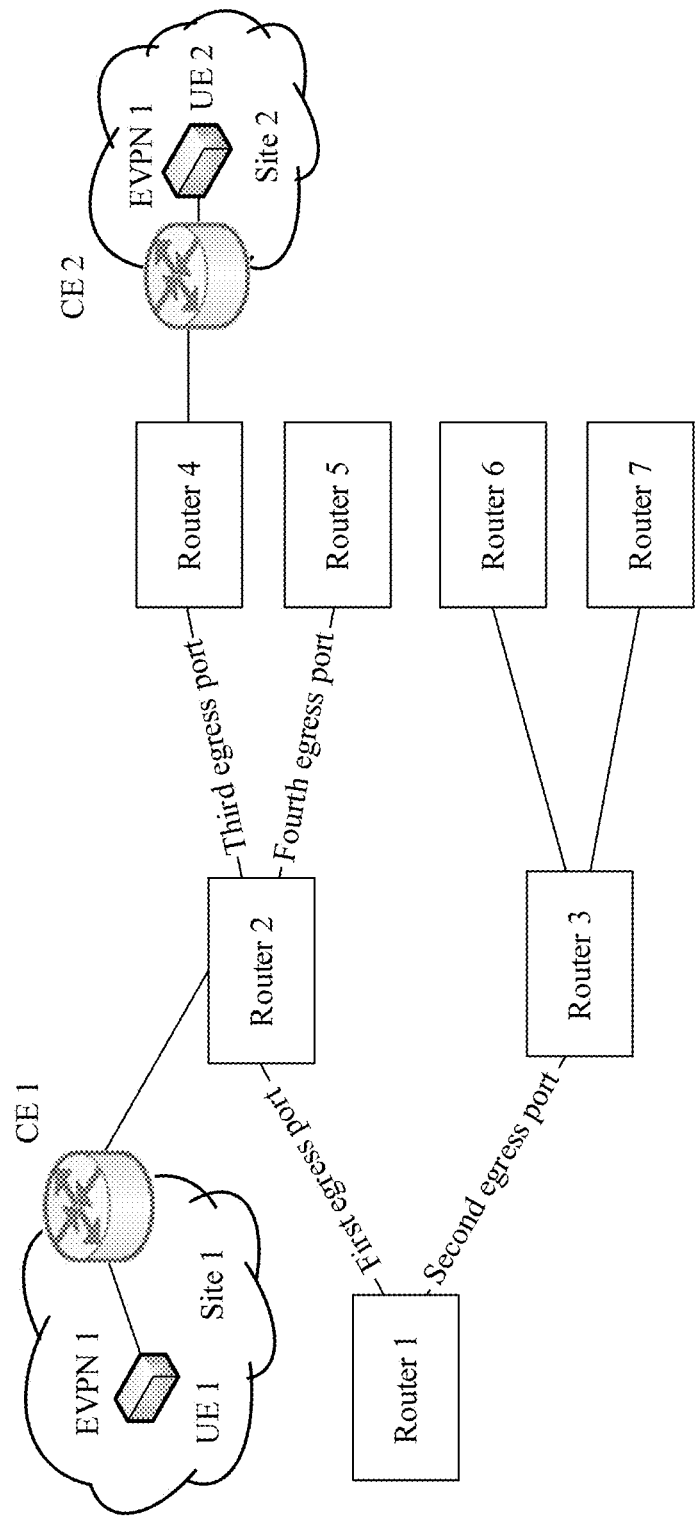
FIG. 1 is a networking structural diagram according to this application.

In the data communications field, a packet may arrive at a destination only after being forwarded by a plurality of forwarding apparatuses. The forwarding apparatus may be a router, and the router may forward an IP packet. The forwarding apparatus may be a network switch, and the network switch may forward an Ethernet frame. FIG. 1 is a networking structural diagram according to this application. Referring to FIG. 1, the networking structural diagram includes a router 1 to a router 7, and a plurality of Ethernet virtual private network (EVPN) sites. The plurality of EVPN sites include a site 1 and a site 2. The site 1 and the site 2 belong to a same EVPN instance (for example, an EVPN 1). Each site may include a customer edge (CE) device and a host. The host may be a user equipment (UE). Each router may include a plurality of physical interface cards. Each physical interface card may include a plurality of ports. FIG. 1 shows two egress ports (a first egress port and a second egress port) in the router 1 and two egress ports (a third egress port and a fourth egress port) in the router 2. The router 1 is connected to the router 2 through the first egress port, and the router 1 is connected to the router 3 through the second egress port. The router 2 is connected to the router 4 through the third egress port, and the router 2 is connected to the router 5 through the fourth egress port.

After the router 1 receives a packet, the router 1 determines an egress port used to forward the packet, for example, the first egress port, and forwards the packet from the first egress port. After the router 2 receives the packet forwarded by the router 1, the router 2 determines an egress port used to forward the packet, for example, the third egress port, and forwards the packet from the third egress port.

In FIG. 1, the router 2 may be a PE, and the router 4 may be a PE. The router 2 may be connected to a CE 1, and a host (for example, UE 1) in the site 1 may communicate with a host (for example, UE 2) outside the site 1 through the CE 1. The router 4 may be connected to a CE 2, and a host (for example, the UE 2) in the site 2 may communicate with a host (for example, the UE 1) outside the site 2 through the CE 2.

Figure 2:
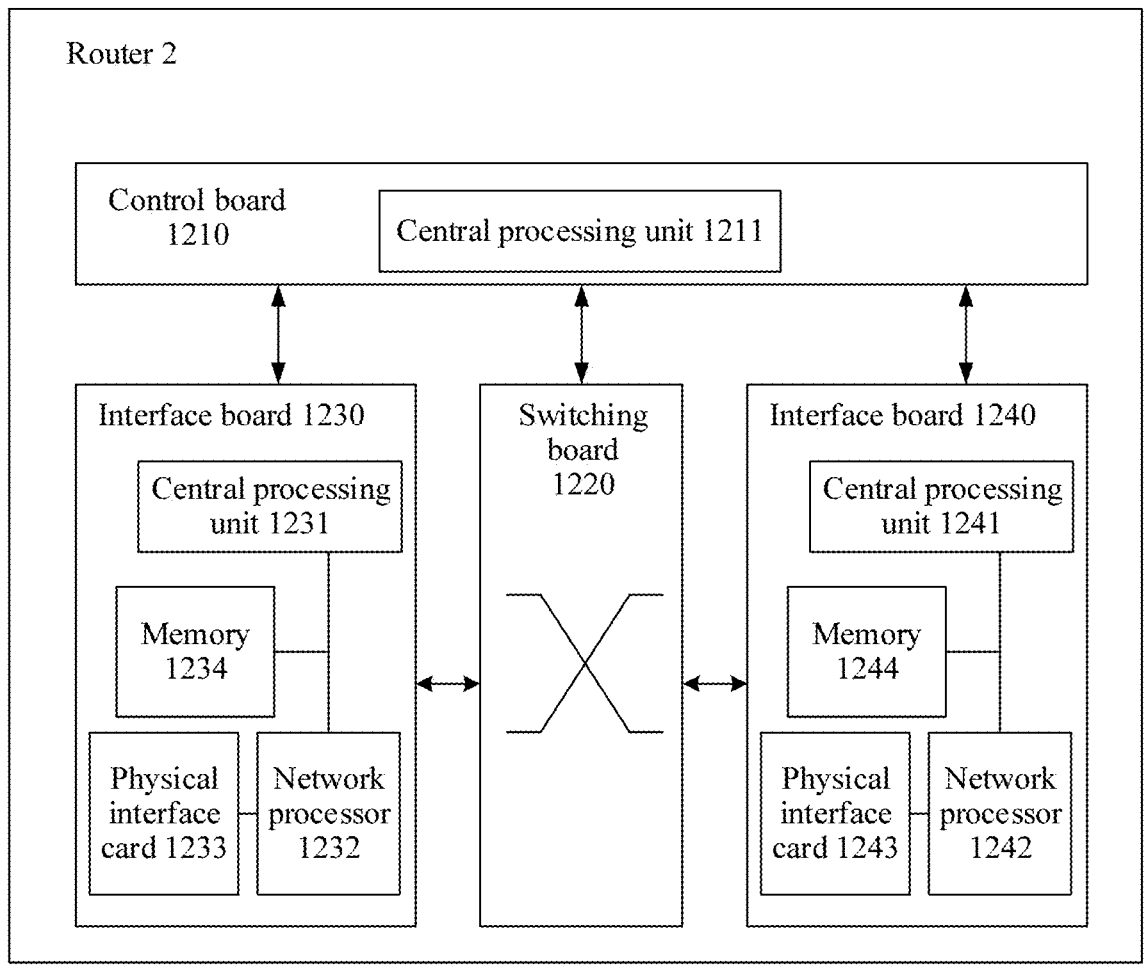
FIG. 2 is a schematic structural diagram of a router according to this application.

FIG. 2 is a possible schematic structural diagram of the router 2 in FIG. 1. The schematic structural diagram shown in FIG. 2 may also be used for other routers (for example, the router 4, the CE 1, and the CE 2) in FIG. 1.

Referring to FIG. 2, the router 2 includes a control board 1210, a switching board 1220, an interface board 1230, and an interface board 1240. The control board 1210 includes a central processing unit 1211. The control board 1210 may be configured to execute a routing protocol. The routing protocol may be a Border Gateway Protocol (BGP) or an Interior Gateway Protocol (IGP). The control board 1210 may generate a routing table by executing the routing protocol, and send the routing table to the interface board 1230 and the interface board 1240. It should be noted that the router 2 in FIG. 1 may alternatively use a structure different from the structure shown in FIG. 2. For example, the router 2 in FIG. 1 may include only one control board and one interface board, and does not include a switching board. Certainly, the router 2 in FIG. 1 may include at least two interface boards. When the router 2 includes only one interface board and does not include a switching board, an IP packet received through an ingress port of the interface board may be sent from an egress port of the interface board after being processed by the interface board. When the router 2 includes a plurality of interface boards and includes a switching board, an IP packet received through an ingress port of one interface board of the router 2 may be sent from an egress port of another interface board of the router 2 after being processed by the switching board. Specific structures of the router 2 and the other routers in FIG. 1 are not limited in this application.

The interface board 1230 may forward an IP packet by searching the routing table. Further, the interface board 1230 includes a central processing unit 1231, a network processor 1232, a physical interface card 1233, and a memory 1234. It should be noted that FIG. 2 does not show all components that can be included in the interface board 1230. During specific implementation, the interface board 1230 may further include another component. For example, the interface board 1230 may further include a traffic manager such that the interface board 1230 has queue scheduling and management functions. In addition, the interface board 1230 may further include an ingress fabric interface chip (iFIC) such that a packet from the interface board 1230 can be switched to the interface board 1240 through the switching board 1220. The central processing unit 1231 may receive a routing table sent by the central processing unit 1211, and store the routing table in the memory 1234. The physical interface card 1233 may be configured to receive an IP packet sent by the router 1. The network processor 1232 may search the routing table in the memory 1234 for a routing entry that matches the IP packet received by the physical interface card 1233, and send the IP packet to the switching board 1220 based on the matched routing entry. The switching board 1220 may be configured to switch an IP packet from an interface board to another interface board. For example, the switching board 1220 may switch the IP packet from the interface board 1230 to the interface board 1240. Further, the switching board 1220 may switch the IP packet from the interface board 1230 to the interface board 1240 through cell switching. For example, the network processor 1232 may obtain a destination IP address in the IP packet. The network processor 1232 may search, according to a longest prefix matching algorithm, the routing table for the routing entry that matches the IP packet, and determine an egress port based on the routing entry that matches the IP packet. The routing entry that matches the IP packet includes an identifier of the egress port. Before the IP packet sent by the network processor 1232 to the switching board 1220 arrives at the switching board 1220, the interface board 1230 may perform queue scheduling and management on the IP packet.

The interface board 1240 may forward the IP packet by searching the routing table. The interface board 1240 includes a central processing unit 1241, a network processor 1242, a physical interface card 1243, and a memory 1244. FIG. 2 does not show all components that can be included in the interface board 1240. During specific implementation, the interface board 1240 may further include another component. For example, the interface board 1240 may further include a traffic manager such that the interface board 1240 has queue scheduling and management functions. In addition, the interface board 1240 may further include an egress fabric interface chip (eFIC) such that the interface board 1240 can correctly receive a packet from the interface board 1230 through the switching board 1220. The central processing unit 1241 may receive the routing table sent by the central processing unit 1211, and store the routing table in the memory 1244. The network processor 1242 may be configured to receive the IP packet from the switching board 1220. The IP packet from the switching board 1220 may be the IP packet that is sent by the router 1 and that is received by the physical interface card 1233. The network processor 1242 may search the routing table in the memory 1244 for a routing entry that matches the IP packet from the switching board 1220, and send the IP packet to the physical interface card 1243 based on the matched routing entry. The physical interface card 1243 may be configured to send the IP packet to the router 4. Before the IP packet sent by the network processor 1242 to the physical interface card 1243 arrives at the physical interface card 1243, the interface board 1240 may perform queue scheduling and management on the IP packet.

When devices in the network shown in FIG. 1 communicate with each other, to-be-transmitted data may need to be protected, for example, the to-be-transmitted data needs to be encrypted, or integrity protection needs to be performed on the to-be-transmitted data. It can be understood that integrity protection may be performed or may not be performed on the to-be-transmitted data when the to-be-transmitted data is being encrypted, or the to-be-transmitted data may be encrypted or may not be encrypted when integrity protection is being performed on the to-be-transmitted data. In a possible design, before a sending device transmits data to a receiving device, the sending device may protect the to-be-transmitted data according to a specific protection protocol, to generate protected data. Because the to-be-transmitted data needs to be protected but has not been protected, the to-be-transmitted data may be referred to as to-be-protected data. The sending device sends the protected data to the receiving device. After receiving the protected data, the receiving device processes the protected data according to the protection protocol, to obtain the to-be-transmitted data. For example, the sending device may encrypt the to-be-transmitted data according to an encryption protocol, to generate encrypted data. Because the to-be-transmitted data needs to be encrypted but has not been encrypted, the to-be-transmitted data may be referred to as to-be-encrypted data. After receiving the encrypted data, the receiving device decrypts the encrypted data according to the encryption protocol, to obtain the data. For another example, the sending device may perform integrity protection on the to-be-transmitted data according to an integrity protection protocol, to generate integrity-protected data. Because the to-be-transmitted data needs to be integrity-protected but has not been integrity-protected, the to-be-transmitted data may be referred to as to-be-integrity-protected data. After receiving the integrity-protected data, the receiving device checks the integrity-protected data according to the integrity protection protocol, to determine that integrity of the data is not damaged. Data to be transmitted between any two devices in the network shown in FIG. 1 may need to be protected. A process of protecting data to be transmitted between the router 2 and the router 4 is described below by using an example.

In a possible design, both the router 2 and the router 4 support an IP Security (IPsec) protocol. For example, the memory 1234 stores a computer program used to execute the IPsec protocol, and the network processor 1232 executes the computer program to execute the IPsec protocol. The IPsec protocol may include an ESP protocol. The router 2 is connected to a host 1 (for example, the UE 1) through the CE 1, and the router 4 is connected to a host 2 (for example, the UE 2) through the CE 2. A packet sent by the host 1 to the host 2 is forwarded through the router 2 and the router 4. The router 2 encrypts a received packet 1 by using the ESP protocol. The packet 1 may be an IP packet, and the packet 1 may be from the host 1. The host 1 may be connected to the router 2 through a switch (not shown in FIG. 1). The host 1 may be a personal computer, or may be a virtual machine running in a server (not shown in FIG. 1). The server may be connected to the router 2 through the switch. The host 2 may be connected to the router 4 through a switch (not shown in FIG. 1). The host 2 may be a personal computer, or may be a virtual machine running in a server (not shown in FIG. 1). The server may be connected to the router 4 through the switch.

Figure 3:
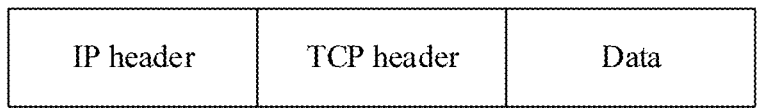
FIG. 3 is a schematic structural diagram of an IP packet according to this application.

FIG. 3 is a possible schematic structural diagram of the packet 1. Referring to FIG. 3, the packet 1 includes an IP header, a TCP header, and data. For example, the IP header may be an IPv4 header. A source IP address in the IP header may be an IP address of the host 1, and a destination address in the IP header may be an IP address of the host 2. The TCP header includes a source port and a destination port. The source port may be a port allocated by the host 1, and the destination port may be a port allocated by the host 2. Content following the IP header in the packet 1 includes the TCP header and the data, and the content following the IP header in the packet 1 is to-be-encrypted data. The IP header includes a protocol field. A value of the protocol field is 0x06. The protocol field is used to indicate that a protocol of the packet header following the IP header in the packet 1 is TCP. In a possible implementation, the packet 1 may not include the TCP header, and the value of the protocol field in the packet 1 may be 0xFF.

Figure 4:
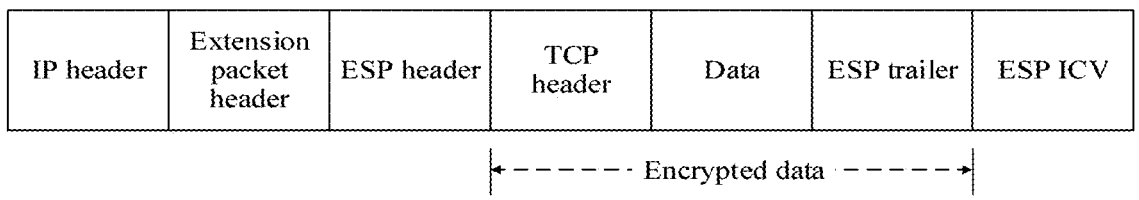
FIG. 4 is a schematic structural diagram of an IP packet according to this application.

After the router 2 receives the packet 1, the network processor 1232 may process the packet 1 by executing the computer program in the memory 1234. Further, the network processor 1232 may add an extension packet header, an ESP header, an ESP trailer, and an ESP integrity check value (ICV) to the packet 1, to generate a packet 2. For example, after the network interface card 1333 receives the packet 1, the network processor 1232 may parse the packet 1 to obtain a version field of the packet 1. The version field is the first four bits of the packet 1. The network processor 1232 may determine, based on a value of the version field, that the packet 1 is an IPv4 packet. FIG. 4 is a possible schematic structural diagram of the packet 2. Referring to FIG. 4, the extension packet header is located after the IP header, and the ESP header is located before the TCP header. The ESP header includes a security parameters index (SPI), a sequence number, and payload data. The ESP trailer includes padding, a pad length, and a next header field. The payload data is obtained by processing to-be-encrypted data by using an encryption algorithm. The payload data may have a substructure. In a process in which the router 2 generates the packet 2 based on the packet 1, the router 2 may encrypt the to-be-encrypted data (referring to the TCP header and the data in FIG. 3) in the packet 1 by using a specific encryption protocol (for example, the ESP protocol), to obtain encrypted data. Referring to FIG. 4, the encrypted data may include the TCP header and the data. In addition, the encrypted data may further include the ESP trailer. For meanings and specific implementations of fields in the packet 2 shown in FIG. 4, refer to descriptions in the Request for Comments (RFC) 4303 released by the Internet Engineering Task Force (IETF), and details are not described herein again.

In the process in which the router 2 generates the packet 2 based on the packet 1, the network processor 1232 may set the value of the protocol field in the IP header in the packet 1 as unassigned or use for experimentation and testing. A person skilled in the art may understand that some values of the protocol field have been assigned. For example, 0x06 has been assigned, and 0x06 is used to indicate the TCP. For another example, 0x02 has been assigned, and 0x02 is used to indicate an Internet Group Management Protocol (IGMP). 0x8F to 0xFC have not been assigned, and 0xFD and 0xFE are used for experimentation and testing. In a possible design, the router 2 may set the value of the protocol field in the IP header in the packet 1 to 0x8F or 0xFD. When the value of the protocol field is 0x8F or 0xFD, it indicates that the packet 2 includes the extension packet header.

Figure 5:
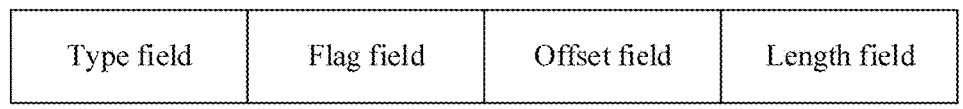
FIG. 5 is a schematic structural diagram of a packet header according to this application.

The router 2 stores a computer program used to generate the extension packet header shown in FIG. 5. A processor in the router 2 may generate the extension packet header shown in FIG. 5 based on the computer program. Further, after the router 2 receives the packet 1, when the router 2 determines that the content in the packet 1 needs to be protected by using the ESP protocol, the processor in the router 2 may determine, based on the computer program, that the extension packet header shown in FIG. 5 needs to be generated.

The router 4 stores a computer program used to parse the extension packet header shown in FIG. 5. A processor in the router 4 may parse, based on the computer program, the extension packet header shown in FIG. 5 that is included in the packet 2. Further, after the router 4 receives the packet 2, the router 4 may obtain the protocol field from the IP header, and determine, based on the value of the protocol field, that the packet 2 includes the extension packet header. Further, the processor in the router 2 may obtain the extension packet header from the packet 2 based on the computer program, and parse the extension packet header based on a structure shown in FIG. 5, to obtain the fields in the extension packet header shown in FIG. 5.

The extension packet header includes a type field. In a possible design, the extension packet header further includes a flag field, an offset field, and a length field. FIG. 5 is a possible schematic structural diagram of the extension packet header. The type field is used to indicate a protection protocol. In this embodiment, the protection protocol is an encryption protocol, and the encryption protocol is the ESP protocol. Therefore, the type field may be used to indicate the ESP protocol. The protection protocol involved in the structure shown in FIG. 5 is the ESP protocol. Another protection protocol may alternatively be used for the packet 2, for example, a MACsec protocol or an IP AH protocol. That is, after the router 2 receives the packet 1, the router 2 may protect the content in the packet 1 by using the ESP protocol or the MACsec protocol. For the AH protocol, refer to RFC 4302. For MACsec, refer to IEEE 802.1AE released by the Institute of Electrical and Electronics Engineers (IEEE).

In a possible design, the type field includes 8 bits. That is, a length of the type field may be 8 bits. In the foregoing scenario, the type field in the extension packet header may indicate 256 protection protocols. For example, when a value of the type field is 0x00, the type field is used to indicate the ESP protocol, or when a value of the type field is 0x01, the type field is used to indicate the MACsec protocol, or when a value of the type field is 0x02, the type field is used to indicate the AH protocol.

It can be learned from the foregoing technical solution that the extension packet header is a new packet header defined in this application, and the type field in the extension packet header is a new field defined in this application. Therefore, the value of the type field has not been assigned. A quantity of values of the type field that can be used to indicate a protection protocol (for example, an encryption protocol) in this application may be greater than a quantity of values of a type field that can be used to indicate a protection protocol (for example, an encryption protocol) in another technical solution. For example, some values of the protocol field in the IP header have been assigned, and therefore there may be a relatively small quantity of values of the protocol field that can be used to indicate a protection protocol.

Referring to FIG. 5, the extension packet header may further include the offset field. The offset field is used to indicate a location of the encrypted data. In the packet 2 shown in FIG. 4, the encrypted data is not adjacent to the extension packet header. Further, the encrypted data is adjacent to the ESP header, and the encrypted data is located after the ESP header. Further, the offset field is used to indicate a start location of the encrypted data. In a possible implementation, by using the sequentially first bit after the extension packet header as a reference, the start location of the encrypted data may be indicated by setting a value of the offset field. For example, assuming that a length of the ESP header is 100 bits, the value of the offset field may be 100 bits. In a possible implementation, by using the sequentially first bit in the extension packet header as a reference, the start location of the encrypted data may be indicated by setting a value of the offset field. For example, assuming that a length of the extension packet header is 50 bits and a length of the ESP header is 100 bits, the value of the offset field may be 150. In a possible implementation, by using the sequentially first bit after the ESP header as a reference, the start location of the encrypted data may be indicated by setting a value of the offset field. According to FIG. 4, the sequentially first bit after the ESP header is the first bit in the TCP header, and the first bit in the TCP header is the start location of the encrypted data. Therefore, the value of the offset field may be 0.

In the packet 2 shown in FIG. 4, the encrypted data includes the TCP header. In a possible implementation, the encrypted data includes the data and the ESP trailer shown in FIG. 4, but does not include the TCP header. The TCP header is a plaintext, and the data is a ciphertext. In the foregoing scenario, the start location of the encrypted data may be determined by using the offset field. For example, by using the sequentially first bit after the ESP header as a reference, the start location of the encrypted data may be indicated by setting the value of the offset field. When a length of the TCP header is 160 bits, the value of the offset field may be 160. The receiving device (for example, the router 4 in FIG. 1) that receives the packet 2 may determine, based on the value of the offset field, that the start location of the encrypted data is the first bit in the data shown in FIG. 4. Further, the router 4 may obtain the encrypted data from FIG. 4, and obtain original data according to a decryption algorithm corresponding to the encryption protocol. The original data includes the data shown in FIG. 3. It can be understood that the original data is not encrypted by using the encryption protocol, and the original data is data existing before encryption is performed according to the encryption protocol.

In the foregoing technical solution, the offset field is used to indicate a location of protected data (for example, the encrypted data). When the encryption protocol is the ESP protocol, the encrypted data is not adjacent to the extension packet header. In this case, if there is no offset field, it may be very difficult for a receiver (for example, the router 4) of the packet 2 to determine the location of the encrypted data in the packet 2. In a possible implementation, when the router 2 encrypts the packet 1 by using another encryption protocol, the encrypted data may be adjacent to the extension protocol header and may be located after the extension protocol header. In this case, the packet 2 may not include the offset field. The router 2 may obtain the protected data (for example, the encrypted data) from the packet 2 based on a default location (for example, the sequentially first bit after the extension packet header).

Referring to FIG. 5, the extension packet header further includes the length field. The length field indicates the length of the extension packet header. For example, the length of the extension packet header may be 50 bits, and a value of the length field may be 50.

Referring to FIG. 5, the extension packet header further includes the flag field. The flag field indicates that the extension packet header includes the offset field. For example, the flag field includes one bit. When a value of the flag field is 1, it indicates that the extension packet header includes the offset field, or when a value of the flag field is 0, it indicates that the extension packet header does not include the offset field. When the receiver (for example, the router 4) of the packet 2 receives the packet 2, the receiver may determine, based on the value of the flag field, whether the packet 2 includes the offset field. When the packet 2 includes the offset field, the location of the encrypted data may be determined based on the value of the offset field. Further, the router 4 may obtain the encrypted data from the packet 2, and process the encrypted data according to an encryption protocol (for example, the ESP protocol). Further, the router 4 may decrypt the encrypted data according to the ESP protocol and the ESP header in the packet 2, to obtain the to-be-encrypted data. Further, the router 4 may obtain the TCP header and the data in FIG. 3 based on the packet 2 in FIG. 4, and the router 4 sends the packet 1 to the host 2. For example, the router 4 searches, based on a destination IP address in the packet 1, a routing table in the router 4 for an entry that matches the destination IP address. The entry includes an identifier of an egress port. The router 4 sends the packet 1 to the host through the egress port.

FIG. 12 is a schematic flowchart of a packet sending method 1200 according to an embodiment. Referring to FIG. 12, the method 1200 includes S1202 and S1204.

S1202: A network device generates a first packet.

The first packet includes a first packet header, a second packet header, and protected data. The first packet header includes an indication field. The indication field is used to indicate that the first packet includes the second packet header. The second packet header includes a type field. The type field is used to indicate a first protection protocol. The protected data is data protected by using the first protection protocol.

S1204: The network device sends the first packet.

The method shown in FIG. 12 may be applied to the network structure shown in FIG. 1. Further, the UE 1 in the site 1 needs to communicate with the UE 2 in the site 2. A packet sent by the UE 1 needs to arrive at the UE 2 through the router 2 and the router 4. In a process of transmitting, in a network, an original packet sent by the UE 1 to the UE 2, the router 2 may protect the original packet by using the method provided in FIG. 12. For example, the router 2 may encrypt the original packet by using the method provided in FIG. 12, to obtain an encrypted packet, after receiving the encrypted packet, the router 4 may decrypt the encrypted packet to obtain the original packet, and the router 4 further sends the original packet to the UE 2. For another example, the router 2 may perform integrity protection on the original packet by using the method provided in FIG. 12, to obtain an integrity-protected packet, after receiving the integrity-protected packet, the router 4 may check integrity of the integrity-protected packet to obtain the original packet, and the router 4 further sends the original packet to the UE 2.

For example, the network device in the method 1200 may be the router 2 in FIG. 1. The router 2 may send the first packet to the router 4. The first packet may be the packet 2 shown in FIG. 4. The first packet header may be the IP header shown in FIG. 4. The second packet header may be the extension packet header. The protected data may include the TCP header and the data shown in FIG. 4. In addition, the protected data may further include the ESP trailer in FIG. 4. The first protection protocol may be an encryption protocol, and the encryption protocol may be the ESP protocol. The type field may be the protocol field in the IP header shown in FIG. 4. It can be understood that the TCP header in FIG. 4 is obtained after the TCP header in FIG. 3 is protected by using the first protection protocol (for example, the ESP protocol). Because the TCP header in FIG. 4 is obtained after the TCP header in FIG. 3 is encrypted by using the ESP protocol, a value of the TCP header in FIG. 3 may be unequal to a value of the TCP header in FIG. 4. According to a same principle, a value of the data in FIG. 3 may be unequal to a value of the data in FIG. 4.

Figure 6:
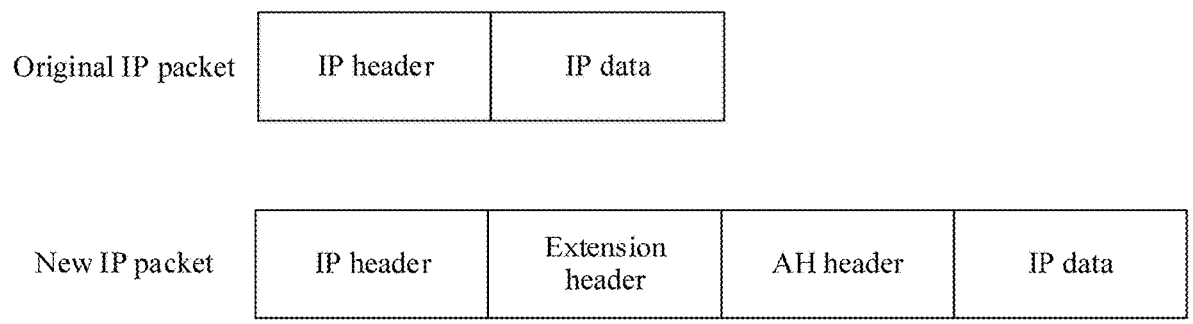
FIG. 6 is a schematic structural diagram of an IP packet according to this application.

In a possible design, the first protection protocol may be an integrity protection protocol. For example, the first protection protocol may be an AH protocol. With reference to FIG. 6, a scenario in which the first protection protocol is the AH protocol is described below by using an example. The network device may be the router 2 in FIG. 1. The first packet may be a new IP packet in FIG. 6. Further, after receiving the original IP packet in FIG. 6, the router 2 may generate the new IP packet based on the original IP packet. The first packet header may be an IP header, the second packet header may be an extension header, the protected data may be IP data, and the indication field may be a protocol field in the IP header. For example, a value of the protocol field may be 0xFC. The protocol field is used to indicate that the new IP packet includes the extension header. The extension header includes a type field, and the type field is used to indicate the AH protocol. It can be understood that IP data in the new IP packet is obtained after IP data in the original IP packet is protected by using the first protection protocol (for example, the AH protocol). Further, the IP data in the original IP packet is processed according to an integrity algorithm of the AH protocol, to obtain the IP data in the new IP packet. Therefore, a value of the IP data in the original IP packet is equal to a value of the IP data in the new IP packet. For the AH protocol, refer to RFC 4302. After the new IP packet is received by a receiving device (for example, the router 4 in FIG. 1), the receiving device may determine, based on the protocol field, that the new IP packet includes the extension header. Further, the receiving device may determine the AH protocol based on the type field in the extension header. The receiving device may check integrity of the IP data according to the integrity algorithm of the AH protocol, to determine whether the integrity of the IP data is damaged. If the integrity of the IP data is not damaged, the receiving device (for example, the router 4 in FIG. 1) may generate the original IP packet based on the new IP packet, and send the original IP packet to the host 2 (for example, the UE 2).

Figure 7:
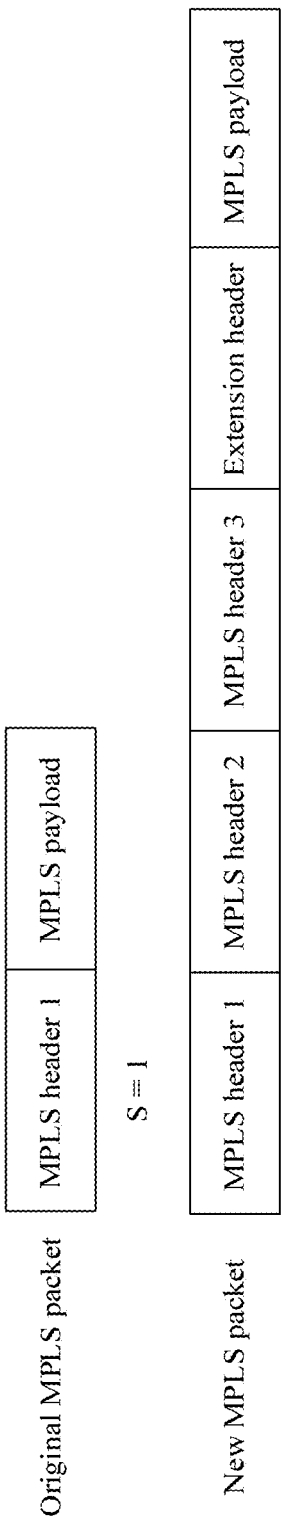
FIG. 7 is a schematic structural diagram of an MPLS packet according to this application.
Figure 8:
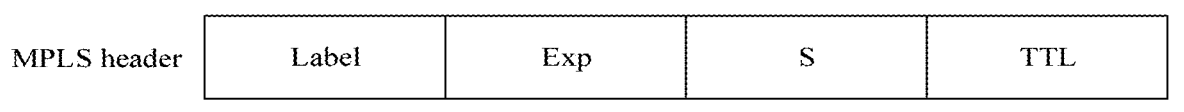

In a possible design, both the router 2 and the router 4 in FIG. 1 support an MPLS protocol. The network device may be the router 2 in FIG. 1. The first packet may be a new MPLS packet in FIG. 7. Further, after receiving an original IP packet sent by the host 1 (for example, the UE 1), the router 2 may encapsulate the original IP packet, to generate an original MPLS packet shown in FIG. 7. An MPLS payload in the original MPLS packet includes the original IP packet. Further, the router 2 may generate the new MPLS packet based on the original MPLS packet. Referring to FIG. 7, the original MPLS packet includes an MPLS header 1 and the MPLS payload. Compared with the original MPLS packet, the new MPLS packet further includes an MPLS header 2, an MPLS header 3, and an extension header. Refer to FIG. 8 for a structure of the MPLS header 1 in the original MPLS packet and structures of the MPLS header 1, the MPLS header 2, and the MPLS header 3 in the new MPLS packet. It should be noted that a value of an S field in the MPLS header 1 in the original MPLS packet is 1, and a value of an S field in the MPLS header 1 in the new MPLS packet is 0. In addition, a value of an S field is 0 and a value of a label field is 15 in the MPLS header 2, and a value of an S field is 0 and a value of a label field is 252 in the MPLS header 3. The first packet header may be the MPLS header 1, the second packet header may be the extension header, and the protected data may be the MPLS payload. The indication field may be a label field in the MPLS header 3. For example, a value of the label field in the MPLS header 3 may be 252. The label field in the MPLS header 3 is used to indicate that the new MPLS packet includes the extension header. The extension header includes a type field, and the type field is used to indicate a protection protocol. The protection protocol is used to protect the MPLS payload. The protection protocol may be an encryption protocol or an integrity protection protocol. In a possible design, the protection protocol may be the ESP protocol. When the protection protocol is the ESP protocol, the new MPLS packet further includes an ESP header, and the ESP header is located between the extension header and the MPLS payload. For a specific implementation in which the protection protocol is the ESP protocol, refer to the embodiment corresponding to FIG. 4. In a possible design, the protection protocol may be the AH protocol. When the protection protocol is the AH protocol, the new MPLS packet further includes an AH header, and the AH header is located between the extension header and the MPLS payload. For a specific implementation in which the protection protocol is the AH protocol, refer to the embodiment corresponding to FIG. 6.

Figure 9:
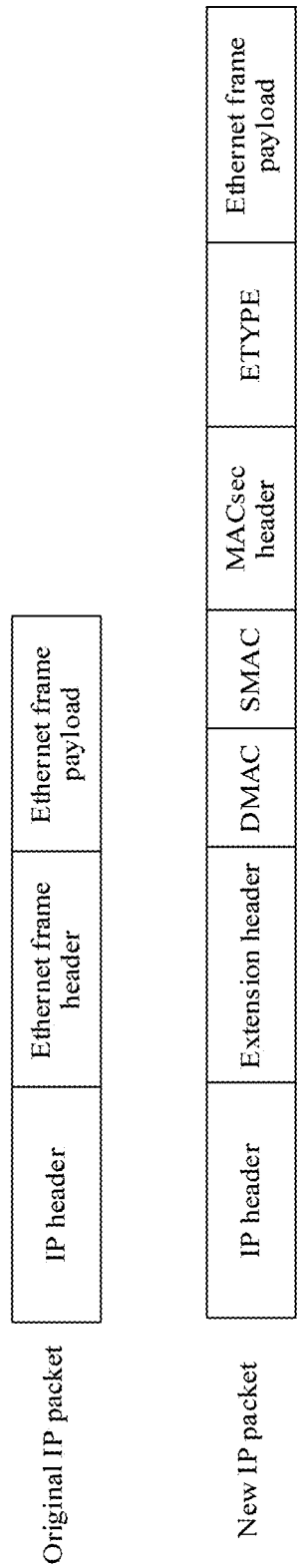
FIG. 9 is a schematic structural diagram of an IP packet according to this application.

In a possible design, the first protection protocol may be an encryption protocol. For example, the first protection protocol may be a MACsec protocol. With reference to FIG. 9, a scenario in which the first protection protocol is the MACsec protocol is described below by using an example. The network device may be the router 2 in FIG. 1. The first packet may be a new IP packet in FIG. 9. Further, after receiving an original IP packet in FIG. 9, the router 2 may generate the new IP packet based on the original IP packet. The original IP packet includes an IP header and an IP payload. The IP payload includes an Ethernet frame, and the Ethernet frame includes an Ethernet frame header and an Ethernet frame payload. The Ethernet frame header includes a destination media access control (MAC) (DMAC) address, a source MAC (SMAC) address, and an Ethernet type (ETYPE). The first packet header may be the IP header. The second packet header may be the extension header. The protected data may include the Ethernet frame payload. In addition, the protected data further includes the ETYPE. The indication field may be a protocol field in the IP header. For example, a value of the protocol field may be 0xFC. The protocol field is used to indicate that the new IP packet includes the extension header. The extension header includes a type field, and the type field is used to indicate the MACsec protocol. It can be understood that the Ethernet frame payload in the new IP packet is obtained after the Ethernet frame payload in the original IP packet is protected by using the first protection protocol (for example, the MACsec protocol). Further, the Ethernet frame payload in the original IP packet is processed according to an encryption algorithm of the MACsec protocol, to obtain the Ethernet frame payload in the new IP packet. Therefore, a value of the Ethernet frame payload in the original IP packet is unequal to a value of the Ethernet frame payload in the new IP packet. For the MACsec protocol, refer to IEEE 802.1AE. After the new IP packet is received by the receiving device (for example, the router 4 in FIG. 1), the receiving device may determine, based on the protocol field, that the new IP packet includes the extension header. Further, the receiving device may determine the MACsec protocol based on the type field in the extension header. The receiving device may decrypt the new IP packet according to a decryption algorithm of the MACsec protocol. Further, the receiving device decrypts the ETYPE and the Ethernet frame payload in the new IP packet to obtain the original IP packet. The receiving device (for example, the router 4 in FIG. 1) may send the original IP packet to the host 2 (for example, the UE 2).

Figure 10:
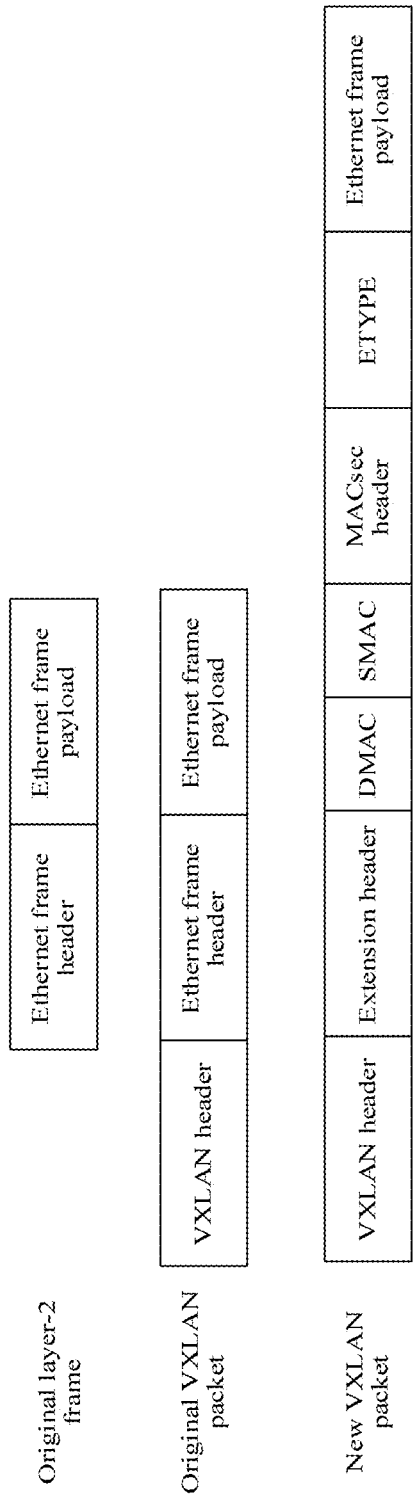
FIG. 10 is a schematic structural diagram of an original layer-2 frame and a virtual extensible local area network (VXLAN) packet according to this application.

In a possible design, the first protection protocol may be an encryption protocol. For example, the first protection protocol may be a MACsec protocol. With reference to FIG. 10 and FIG. 11, a scenario in which the first protection protocol is the MACsec protocol is described below by using an example. The network device may be the router 2 in FIG. 1. The first packet may be a new VXLAN packet in FIG. 9. Further, after receiving an original layer-2 frame (original L2 frame) in FIG. 10, the router 2 may perform VXLAN encapsulation on the original layer-2 frame to obtain an original VXLAN packet. The router 2 may encrypt the original VXLAN packet according to an encryption algorithm specified in the MACsec protocol, to obtain the new VXLAN packet. A VXLAN header in FIG. 10 may be VXLAN GPE. For a structure of the VXLAN header in FIG. 10, refer to VXLAN GPE in FIG. 11. Further, the VXLAN GPE includes a flag field, a reserved 1 field, a next protocol field, a VNI field, and a reserved 2 field. The flag field is one byte, the reserved 1 field is two bytes, the next protocol field is one byte, the VNI field is three bytes, and the reserved 2 field is one byte. For values and functions of the fields in FIG. 11, refer to draft-quinn-vxlan-gpe-03. The original layer-2 frame includes an Ethernet frame header and an Ethernet frame payload. The Ethernet frame header includes a DMAC, an SMAC, and an ETYPE. The first packet header may be the VXLAN header. The second packet header may be the extension header. The protected data may include the Ethernet frame payload. In addition, the protected data further includes the ETYPE. The indication field may be a Next Protocol field in the VXLAN header, and the next protocol field is used to indicate that the new VXLAN packet includes the extension header. The extension header includes a type field, and the type field is used to indicate the MACsec protocol. It can be understood that the Ethernet frame payload in the new VXLAN packet is obtained after the Ethernet frame payload in the original layer-2 frame is protected by using the first protection protocol (for example, the MACsec protocol). Further, the Ethernet frame payload in the original layer-2 frame is processed according to an encryption algorithm of the MACsec protocol, to obtain the Ethernet frame payload in the new VXLAN packet. Therefore, a value of the Ethernet frame payload in the original layer-2 frame is unequal to a value of the Ethernet frame payload in the new VXLAN packet. After the new VXLAN packet is received by the receiving device (for example, the router 4 in FIG. 1), the receiving device may determine, based on the next protocol field, that the new VXLAN packet includes the extension header. Further, the receiving device may determine the MACsec protocol based on the type field in the extension header. The receiving device may decrypt the new VXLAN packet according to a decryption algorithm of the MACsec protocol. Further, the receiving device decrypts the ETYPE and the Ethernet frame payload in the new VXLAN packet to obtain the original layer-2 frame. The receiving device (for example, the router 4 in FIG. 1) may send the original layer-2 frame to the host 2 (for example, the UE 2).

In a possible design, the second packet header further includes an offset field, and the offset field is used to indicate a location of the protected data.

FIG. 13 is a schematic flowchart of a packet receiving method 1300 according to an embodiment. Referring to FIG. 13, the method includes S1302 and S1304.

S1302: A network device receives a first packet.

The first packet includes a first packet header, a second packet header, and protected data. The first packet header includes an indication field. The indication field is used to indicate that the first packet includes the second packet header. The second packet header includes a type field. The type field is used to indicate a first protection protocol. The protected data is data protected by using the first protection protocol.

S1304: The network device obtains original data according to the first protection protocol and the protected data.

The original data is not protected by using the first protection protocol.

The method 1300 shown in FIG. 13 may be applied to the network structure shown in FIG. 1. Further, the UE 1 in the site 1 needs to communicate with the UE 2 in the site 2. A packet sent by the UE 1 needs to arrive at the UE 2 through the router 2 and the router 4. In a process of transmitting, in a network, an original packet sent by the UE 1 to the UE 2, the router 2 may protect the original packet by using the method 1200. For example, the router 2 may encrypt the original packet by using the method 1200, to obtain an encrypted packet, and the router 4 may obtain the original packet by using the method 1300. Further, after receiving the encrypted packet, the router 4 may decrypt the encrypted packet to obtain the original packet, and the router 4 further sends the original packet to the UE 2. For another example, the router 2 may perform integrity protection on the original packet by using the method provided in FIG. 12, to obtain an integrity-protected packet, and the router 4 may obtain the original packet by using the method 1300. Further, after receiving the integrity-protected packet, the router 4 may check integrity of the integrity-protected packet to obtain the original packet, and the router 4 further sends the original packet to the UE 2.

In a possible design, the first protection protocol may be an encryption protocol. For example, the first protection protocol may be a MACsec protocol. With reference to FIG. 9, a scenario in which the first protection protocol is the MACsec protocol is described below by using an example. The network device in the method 1300 may be the router 4 in FIG. 1. The first packet may be the new IP packet in FIG. 9. Further, after receiving the original IP packet in FIG. 9, the router 2 may generate the new IP packet based on the original IP packet. The original IP packet includes an IP header and an IP payload. The IP payload includes an Ethernet frame. The Ethernet frame includes an Ethernet frame header and an Ethernet frame payload. The Ethernet frame header includes a DMAC, an SMAC, and an ETYPE. The first packet header may be the IP header. The second packet header may be the extension header. The protected data may include the Ethernet frame payload. In addition, the protected data further includes the ETYPE. The indication field may be a protocol field in the IP header. For example, a value of the protocol field may be 0xFC. The protocol field is used to indicate that the new IP packet includes the extension header. The extension header includes a type field, and the type field is used to indicate the MACsec protocol. It can be understood that the Ethernet frame payload in the new IP packet is obtained after the Ethernet frame payload in the original IP packet is protected by using the first protection protocol (for example, the MACsec protocol). Further, the Ethernet frame payload in the original IP packet is processed according to an encryption algorithm of the MACsec protocol, to obtain the Ethernet frame payload in the new IP packet. Therefore, a value of the Ethernet frame payload in the original IP packet is unequal to a value of the Ethernet frame payload in the new IP packet. For the MACsec protocol, refer to IEEE 802.1AE. After the new IP packet is received by the router 4, the router 4 may determine, based on the protocol field, that the new IP packet includes the extension header. Further, the router 4 may determine the MACsec protocol based on the type field in the extension header. The router 4 may decrypt the new IP packet according to a decryption algorithm of the MACsec protocol. Further, the router 4 decrypts the ETYPE and the Ethernet frame payload in the new IP packet to obtain the original IP packet. The original data involved in the method 1300 may include the Ethernet frame payload in the original IP packet. The router 4 may send the original IP packet to the host 2 (for example, the UE 2). It can be understood that the Ethernet frame payload in the original IP packet is unencrypted data, and the Ethernet frame payload in the original IP packet is data existing before encryption is performed according to the encryption algorithm of the MACsec protocol.

It can be learned that the first packet in the method 1300 and the first packet in the method 1200 may be a same packet. The method 1200 may be executed by the router 2, and the method 1300 may be executed by the router 4. Therefore, for a specific implementation of the method 1300 shown in FIG. 13, refer to the descriptions of the method 1200 shown in FIG. 12 in the embodiment.

Figure 14:
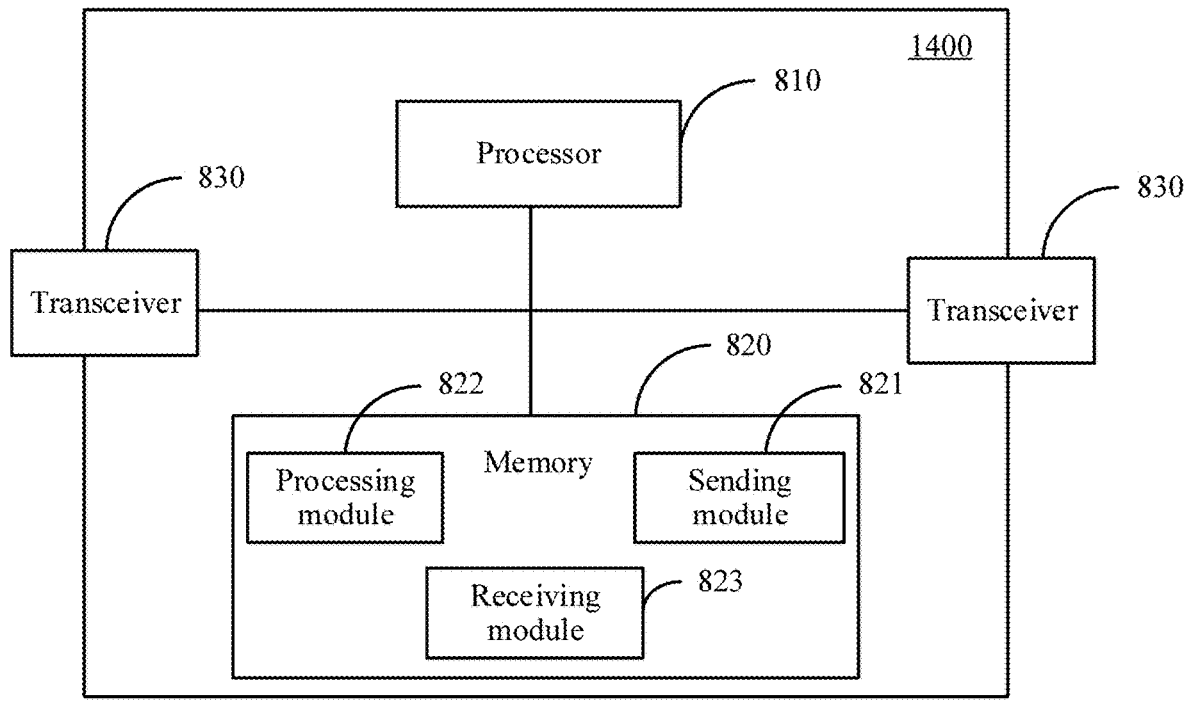
FIG. 14 is a schematic structural diagram of a network device according to this application.

FIG. 14 is a schematic diagram of a network device 1400 according to this application. The network device 1400 may be applied to the network architecture shown in FIG. 1, for example, may be the router 1 in the network architecture shown in FIG. 1. The network device 1400 may be configured to perform the method 1200 shown in FIG. 12. As shown in FIG. 14, the network device 1400 may include a processor 810, and a memory 820 coupled to the processor 810, and a transceiver 830. The processor 810 may be a central processing unit (CPU), a network processor (NP), or a combination of a CPU and an NP. Alternatively, the processor may be an application-specific integrated circuit (ASIC), a programmable logic device (PLD), or a combination thereof. The PLD may be a complex PLD (CPLD), a field-programmable gate array (FPGA), generic array logic (GAL), or any combination thereof. The processor 810 may be one processor, or may include a plurality of processors. The memory 820 may include a volatile memory such as a random-access memory (RAM), or the memory may include a nonvolatile memory such as a read-only memory (ROM), a flash memory, a hard disk drive (HDD), or a solid-state drive (SSD), or the memory 820 may include a combination of the foregoing types of memories. The memory 820 may be one memory, or may include a plurality of memories. In an implementation, the memory 820 stores a computer-readable instruction. The computer-readable instruction includes a plurality of software modules, for example, a sending module 821, a processing module 822, and a receiving module 823. After executing each software module, the processor 810 may perform a corresponding operation based on the indication of each software module. In this embodiment, an operation performed by one software module is actually an operation performed by the processor 810 based on the indication of the software module. For example, the receiving module 823 is configured to receive the packet 1 from the UE 1, the processing module 822 is configured to generate the first packet in the method 1200 based on the packet 1, and the sending module 821 is configured to send the first packet to the router 4.

Figure 15:
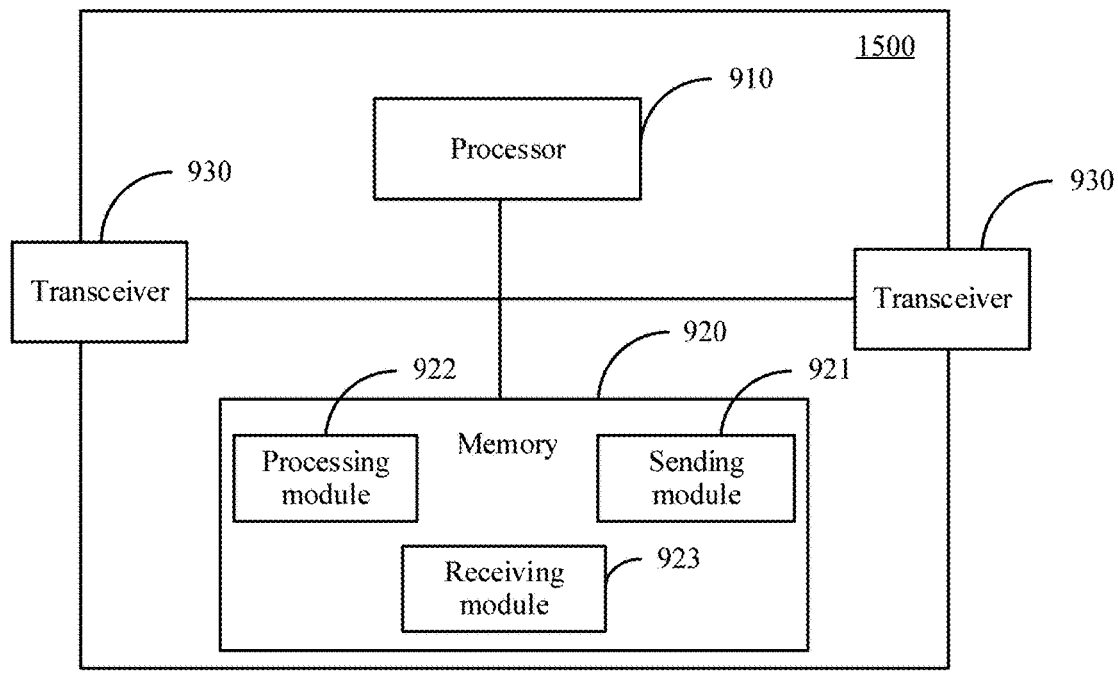
FIG. 15 is a schematic structural diagram of a network device according to this application.

FIG. 15 is a schematic diagram of a network device 1500 according to this application. The network device 1500 may be applied to the network architecture shown in FIG. 1, for example, may be the router 4 in the network architecture shown in FIG. 1. The network device 1500 may be configured to perform the method 1300 shown in FIG. 13. As shown in FIG. 15, the network device 1500 may include a processor 910, a memory 920 coupled to the processor 910, and a transceiver 930. The processor 910 may be a CPU, an NP, or a combination of a CPU and an NP. The processor may further include a hardware chip. The hardware chip may be an ASIC, a PLD, or a combination thereof. The PLD may be a CPLD, an FPGA, GAL, or any combination thereof. The processor 910 may be one processor, or may include a plurality of processors. The memory 920 may include a volatile memory such as a RAM, or the memory may include a nonvolatile memory such as a ROM, a flash memory, an HDD, or an SSD, or the memory may include a combination of the foregoing types of memories. The memory 920 may be one memory, or may include a plurality of memories. In an implementation, the memory 920 stores a computer-readable instruction. The computer-readable instruction may include a plurality of software modules, for example, a sending module 921, a processing module 922, and a receiving module 923. After executing each software module, the processor 910 may perform a corresponding operation based on the indication of each software module. In this embodiment, an operation performed by one software module is actually an operation performed by the processor 910 based on the indication of the software module. For example, the receiving module 923 is configured to receive the first packet from the router 2, the processing module 922 is configured to generate original data based on the first packet, such as the original data included in the original IP packet in FIG. 9, and the sending module 921 is configured to send the original IP packet shown in FIG. 9 to the UE 2.

An embodiment of this application further provides a communications system. The communications system includes the network device 1400 provided in FIG. 14 and the network device 1500 provided in FIG. 15.

This application further provides a non-transitory computer-readable storage medium. The non-transitory computer-readable storage medium is configured to store a computer program. When the computer program is executed by a processor, the processor is enabled to perform the method shown in FIG. 12 or FIG. 13. For details, refer to the descriptions of the embodiment shown in FIG. 12 or FIG. 13, and details are not described herein again.

In a possible design of the foregoing embodiments, the first protection protocol is an encryption protocol or an integrity protection protocol.

In a possible design of the foregoing embodiments, the first protection protocol is an AH protocol, an ESP protocol, a MACsec protocol, a TLS protocol, or an SSL protocol.

In a possible design of the foregoing embodiments, the first packet header is an MPLS header, and the indication field is an MPLS label field in the first packet header.

In a possible design of the foregoing embodiments, the first packet header is an Ethernet header, and the indication field is an Ethernet type field in the first packet header.

In a possible design of the foregoing embodiments, the first packet header is an IP header, and the indication field is a protocol field in the first packet header.

In a possible design of the foregoing embodiments, the first packet header is a TCP header, and the indication field is a reserved field or an option field.

In a possible design of the foregoing embodiments, the first packet header is an HTTP header, and the type field is an extension field.

A person of ordinary skill in the art may be aware that, in combination with the examples described in the embodiments disclosed in this specification, modules and method operations may be implemented through electronic hardware or a combination of computer software and electronic hardware. Whether the functions are performed by hardware or software depends on particular applications and design constraints of the technical solutions. A person skilled in the art may use different methods to implement the described functions for each particular application.

It can be clearly understood by a person skilled in the art that, for the purpose of convenient and brief description, for a detailed working process of the foregoing system, apparatus, and module, refer to a corresponding process in the foregoing method embodiments, and details are not described herein again.

All or some of the foregoing embodiments may be implemented by using hardware, firmware, or any combination thereof. When the embodiments relate to software, all or some of the software may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a SSD), or the like.

All parts in this specification are described in a progressive manner. For same or similar parts in the implementations, mutual reference may be made. Each implementation focuses on a difference from other implementation. Especially, apparatus and system embodiments are basically similar to a method embodiment, and therefore are described briefly. For related parts, refer to descriptions in the method embodiment.

What is claimed is:

1. A packet sending method implemented by a network device, comprising:
   generating a first packet comprising a first packet header, a second packet header, and protected data, wherein the first packet header comprises an indication field indicating that the first packet comprises the second packet header, wherein the second packet header comprises: 1) a type field indicating a first protection protocol, wherein the protected data is protected by the first protection protocol; 2) an offset field indicating a location of the protected data; and 3) a flag field indicating whether the second packet header comprises the offset field that indicates the location of the protected data; and
   sending the first packet.

2. The packet sending method of claim 1, wherein the second packet header further comprises a length field indicating a length of the second packet header.

3. The packet sending method of claim 1, wherein the first protection protocol is an encryption protocol.

4. The packet sending method of claim 1, wherein the first protection protocol is an integrity protection protocol.

5. A packet receiving method implemented by a network device, comprising:
   receiving a first packet comprising a first packet header, a second packet header, and protected data, wherein the first packet header comprises an indication field indicating that the first packet comprises the second packet header, wherein the second packet header comprises: 1) a type field indicating a first protection protocol, wherein the protected data is protected by the first protection protocol; 2) an offset field indicating a location of the protected data; and 3) a flag field indicating whether the second packet header comprises the offset field that indicates the location of the protected data; and
   obtaining original data according to the first protection protocol and the protected data, wherein the original data is not protected by using the first protection protocol.

6. The packet receiving method of claim 5, wherein the second packet header further comprises a length field indicating a length of the second packet header.

7. The packet receiving method of claim 5, wherein the first protection protocol is an encryption protocol.

8. The packet receiving method of claim 5, wherein the first protection protocol is an integrity protection protocol.

9. A network device, comprising:
   a memory configured to store a computer program; and
   a processor coupled to the memory and configured to execute the computer program to cause the network device to:
      generate a first packet comprising a first packet header, a second packet header, and protected data, wherein the first packet header comprises an indication field indicating that the first packet comprises the second packet header, wherein the second packet header comprises: 1) a type field indicating a first protection protocol, wherein the protected data is protected by the first protection protocol; 2) an offset field indicating a location of the protected data; and 3) a flag field indicating whether the second packet header comprises the offset field that indicates the location of the protected data; and
      send the first packet.

10. The network device of claim 9, wherein the second packet header further comprises a length field indicating a length of the second packet header.

11. The network device of claim 9, wherein the first protection protocol is an encryption protocol.

12. The network device of claim 9, wherein the first protection protocol is an integrity protection protocol.

13. The network device of claim 9, wherein the first packet header is a multiprotocol label switching (MPLS) header, and wherein the indication field is an MPLS label field.

14. The network device of claim 9, wherein the first packet header is an Ethernet header, and wherein the indication field is an Ethernet type (ETYPE) field.

15. The packet sending method of claim 1, wherein the first packet header is a multiprotocol label switching (MPLS) header, and wherein the indication field is an MPLS label field.

16. The packet sending method of claim 1, wherein the first packet header is an Ethernet header, and wherein the indication field is an Ethernet type (ETYPE) field.

17. The packet receiving method of claim 5, wherein the first packet header is a multiprotocol label switching (MPLS) header, and wherein the indication field is an MPLS label field.

18. The packet receiving method of claim 5, wherein the first packet header is an Ethernet header, and wherein the indication field is an Ethernet type (ETYPE) field.

19. The packet sending method of claim 1, wherein first protection protocol is an Encapsulating Security Payload (ESP) protocol.

20. The packet receiving method of claim 5, wherein first protection protocol is an Encapsulating Security Payload (ESP) protocol.

* * * * *